United States Patent
Gagliardi, Jr.

(10) Patent No.: US 7,780,507 B2
(45) Date of Patent: Aug. 24, 2010

(54) METHOD OF CUTTING BEEF SHORT RIBS AND BEEF PRODUCTS PRODUCED BY THE METHOD

(75) Inventor: Eugene D. Gagliardi, Jr., Cochranville, PA (US)

(73) Assignee: Skippack Creek Corporation, Wilmington, DE (US)

( * ) Notice: Subject to any disclaimer, the term of this patent is extended or adjusted under 35 U.S.C. 154(b) by 161 days.

(21) Appl. No.: 12/244,372

(22) Filed: Oct. 2, 2008

(65) Prior Publication Data

US 2009/0169711 A1 Jul. 2, 2009

Related U.S. Application Data

(60) Provisional application No. 61/009,238, filed on Dec. 27, 2007.

(51) Int. Cl.
*A22B 5/00* (2006.01)
(52) U.S. Cl. .................................................. 452/198
(58) Field of Classification Search ................ 452/198; 426/641, 644, 241, 243, 296, 438, 518, 512, 426/513, 104, 643, 76
See application file for complete search history.

(56) References Cited

U.S. PATENT DOCUMENTS

| | | | | |
|---|---|---|---|---|
| 2,609,564 | A * | 9/1952 | Grimm | 425/301 |
| 2,877,121 | A * | 3/1959 | Anderson et al. | 426/393 |
| 3,635,732 | A * | 1/1972 | Bissett | 426/421 |
| 3,717,473 | A * | 2/1973 | Bissett | 426/76 |
| 5,346,711 | A * | 9/1994 | Gagliardi | 426/243 |
| 5,415,881 | A * | 5/1995 | Gagliardi | 426/76 |
| 6,428,838 | B1 * | 8/2002 | Gagliardi, Jr. | 426/644 |
| 7,214,129 | B2 * | 5/2007 | Couture et al. | 452/171 |

* cited by examiner

*Primary Examiner*—Thomas Price
(74) *Attorney, Agent, or Firm*—Sheridan Ross P.C.

(57) ABSTRACT

A method of cutting beef short ribs having a first, concavely shaped inside surface and a second convexly shaped outside surface comprises the steps of: separating the short ribs into a plurality of generally equally sized individual rib meat portions, each having a rib bone, by cutting completely through the short ribs from the first surface to the second surface along cut lines extending generally midway between and generally parallel to the rib bones; and making a series of generally parallel cuts into the meat on at least one of the first and second surfaces of each of the rib portions, the cuts made into each rib portion extending generally perpendicular to the rib bone along the entire length of the meat from one end of the rib bone to the other end of the rib bone and being spaced apart from each other by a first predetermined distance.

20 Claims, 6 Drawing Sheets

METHOD OF CUTTING BEEF SHORT RIBS AND BEEF PRODUCTS PRODUCED BY THE METHOD

CROSS REFERENCE TO RELATED APPLICATIONS

This application claims the benefit of priority from U.S. Provisional Patent Application No. 61/009,238 filed Dec. 27, 2007 and entitled "Method of Cutting Beef Short Ribs and Beef Products Produced by the Method", the entire subject matter if which is incorporated herein by reference.

BACKGROUND OF THE INVENTION

The present invention relates to a method of cutting beef short ribs and, more particularly, to a method of cutting beef short ribs to create new beef rib products in a manner that simplifies cooking and increases the overall per-pound value of the beef short ribs.

Beef short ribs, particularly plate short ribs, have been sold in substantially the same manner for many years. Typically plate short ribs comprise three or more ribs taken from between the fifth and thirteenth ribs of beef and the surrounding meat. Often such short ribs are sold as a beef brisket. Regardless of the number of ribs involved or the name of the cut, because the short rib portion of the beef is relatively low in fat and high in relatively tough muscle, to make it edible it must be slow cooked, usually at a low temperature for a long period of time, typically eight hours or more, such as by cooking the short ribs in water or some other liquid (braising). Slow cooking in this manner makes the cooked beef tender enough for consumption. The yield or price per pound obtained for beef short ribs is usually relatively low because many consumers simply do not want to take the time required to slow cook the short ribs and such a slow cooked or braised cut of beef is not as appealing to some consumers as some other beef cuts, such as a sirloin steak.

The present invention comprises a new method of cutting beef short ribs by first separating the short ribs into individual rib portions each rib portion having meat surrounding a single rib bone, trimming the rib portions to remove excess fat, silver and the like, Frenching at least one end of each of the rib portions to expose a portion of the rib bone and cutting into the meat on one surface of each rib portion along a series of spaced, generally parallel cut lines extending across the rib bones. The resulting beef rib products may be cooked in a non-slow manner while still providing tender meat. For example, the beef rib products made in accordance with the present invention may be grilled, baked, broiled or the like. Because the resulting beef rib products may be cooked in a much faster manner, they are more acceptable to consumers who do not want to take the time for slow cooking. As a result, the demand for beef rib products made in accordance with the present invention is expected to increase which will be accompanied by an increase in the overall per pound price for beef short ribs.

BRIEF SUMMARY OF THE INVENTION

Briefly stated, the present invention comprises, in one embodiment, a method of cutting beef short ribs to create beef rib products having enhanced per pound value, the short ribs comprising a plate having a plurality of rib bones taken from between the fifth and thirteenth ribs of beef and the meat surrounding the rib bones, the short ribs having a first, generally concavely shaped inside surface and a second generally convexly shaped outside surface. The method comprises the steps of: separating the short ribs into a plurality of generally equally sized individual rib meat portions, each having a rib bone, by cutting completely through the short ribs from the first surface to the second surface along cut lines extending generally midway between and generally parallel to the rib bones; and making a series of generally parallel cuts into the meat on at least one of the first and second surfaces of each of the rib portions, the cuts made into each rib portion extending generally perpendicular to the rib bone along the entire length of the meat from one end of the rib bone to the other end of the rib bone and being spaced apart from each other by a first predetermined distance.

In another embodiment the present invention comprises a method of cutting beef short ribs to create a beef rib product having enhanced per pound value, the short ribs including at least two ribs taken from between the fifth and thirteenth ribs of beef and the meat surrounding the rib bones, the short ribs having a first, generally concavely shaped inside surface and a second generally convexly shaped outside surface. The method comprises the steps of: separating from the short ribs an individual rib meat portion containing meat attached to a rib bone by cutting completely through the short ribs from the first surface to the second surface along at least one cut line extending generally parallel to and spaced from the rib bone; and making a series of generally parallel cuts into the meat on at least one of the first and second surfaces of the rib meat portion, the cuts extending generally perpendicular to the rib bone along the entire length of the meat from one end of the rib bone to the other end of the rib bone and being spaced apart from each other by a first predetermined distance.

In yet another embodiment the present invention comprises a method of cutting beef short ribs to create beef rib products having enhanced per pound value, the short ribs comprising a plate having at least three rib bones taken from between the fifth and thirteenth ribs of beef and the meat surrounding the rib bones the short ribs having a first, generally concavely shaped inside surface and a second generally convexly shaped outside surface. The method comprises the steps of: separating the short ribs into three generally equally sized individual rib meat portions, each having a rib bone, by cutting completely through the short ribs from the first surface to the second surface along two cut lines extending generally midway between and generally parallel to the rib bones; trimming each of the rib meat portions to remove excess fat, silver and other undesirable components; making a series of generally parallel cuts into the meat on at least one of the first and second surfaces of each of the rib meat portions, the cuts made into each rib meat portion extending generally perpendicular to the rib bone along the entire length of the meat from one end of the rib bone to the other end of the rib bone and being spaced apart from each other by a first predetermined distance; and removing a predetermined length of the meat from at least one end of each of the rib bones to expose a portion of each of the rib bones.

BRIEF DESCRIPTION OF THE SEVERAL VIEWS OF THE DRAWINGS

The following detailed description of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the beef short rib and short rib products in accordance with the present invention, and designated parts thereof. Unless specifically set forth herein, the terms "a", "an" and "the" are not limited to one element but instead should be read as meaning "at least one". The terminology includes the words noted above, derivatives thereof and words of similar import.

Figure 1:
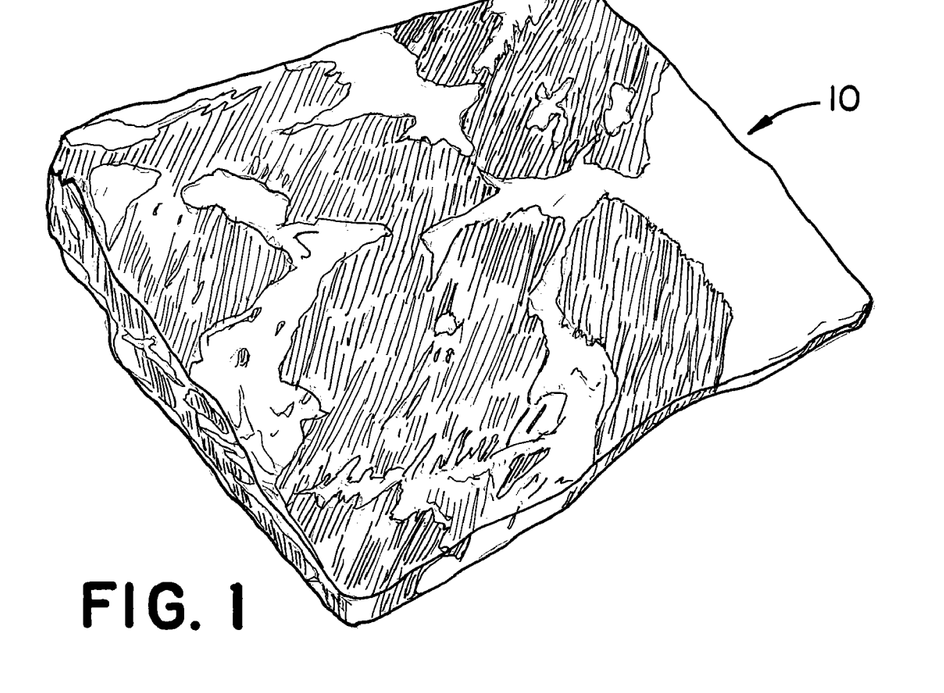
FIG. 1 is a perspective view of an outside convexly shaped surface of an untrimmed plate short ribs of beef.
Figure 2:
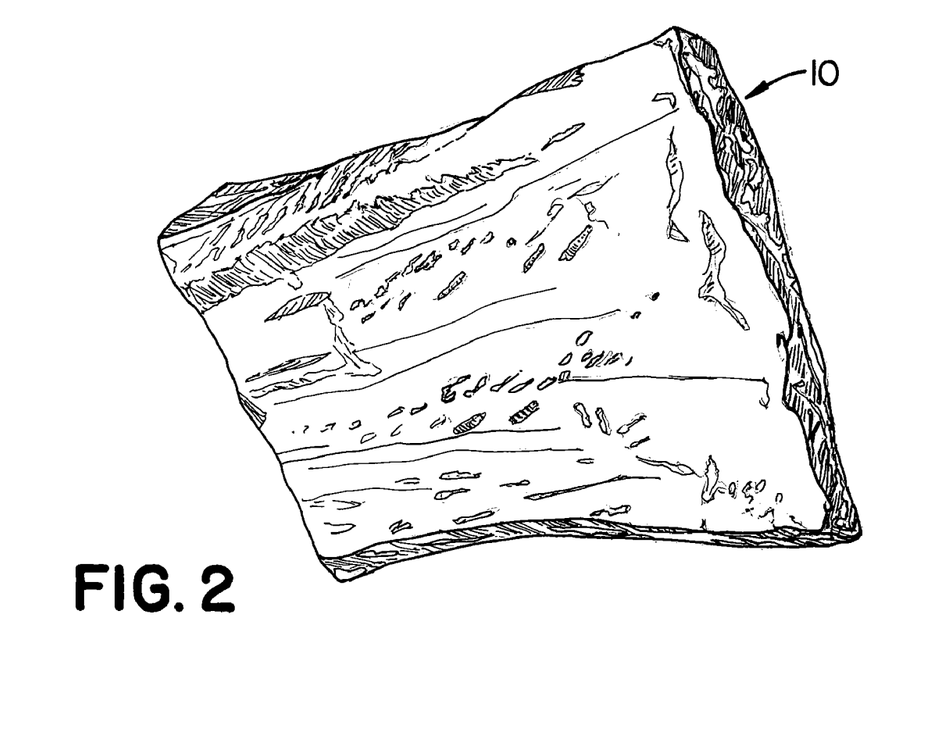
FIG. 2 is a perspective view of an inside concavely shaped surface of the untrimmed short ribs shown in FIG. 1.

Referring to the drawings, where the same reference numerals are used for the same components throughout the several Figures, there is shown in FIGS. 1 and 2 two principal surfaces (outside and inside respectively) of a standard or typical prior art nine inch plate short ribs of beef 10 as it would appear after having been separated from the remainder of a side of beef (not shown). As shown, the short ribs 10 includes at least three rib bones 16 (FIG. 3) and the surrounding rib meat. However, typical short ribs could include a greater or lesser number of rib bones 16 and surrounding meat, usually taken from between the fifth and thirteenth ribs. Typically, in the prior art, short ribs of beef 10 of the type shown are called a brisket of beef and because the meat surrounding the rib bones 16 is low in fat and high in muscle it is usually very tough. Accordingly, short ribs of beef 10 are generally prepared by braising or other slow cooking methods usually at a relatively low temperature (for example in a crock pot) for a relatively long period of time, for example up to eight hours or more to make the meat tender. The present invention comprises a method of cutting short ribs of beef 10 in a new and different manner to obtain new, relatively low fat, high protein beef rib products which may be grilled, broiled or otherwise cooked relatively quickly and without the need for braising or other traditional slow cooking. The present method has the effect of converting a relatively low price per pound cut of meat (i.e. the short ribs of beef 10) into new beef rib products that may be sold at a substantially higher price per pound.

Figure 3:
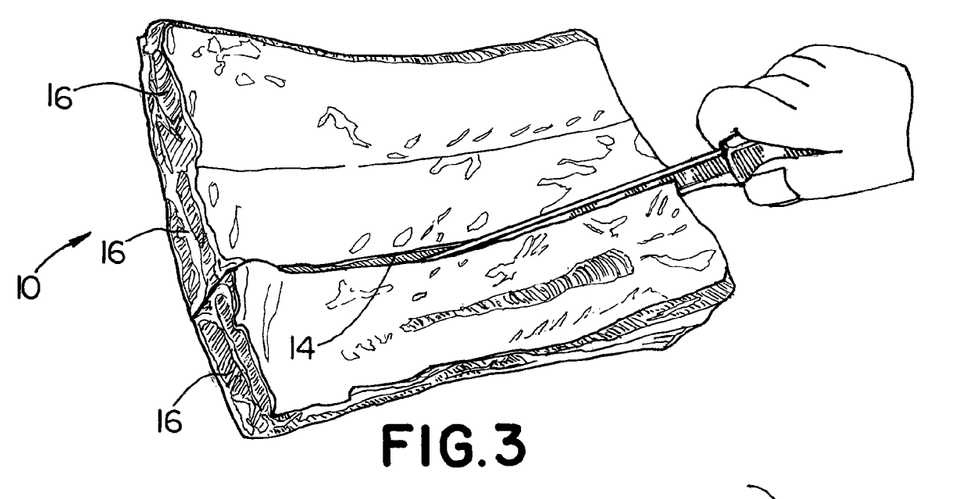
FIG. 3 is a perspective view of the untrimmed short rib shown in FIG. 2 illustrating a first step of cutting completely through the short ribs between the rib bones to separate the short ribs into three individual rib meat portions, each including a single rib bone, in accordance with the present method.
Figure 4:
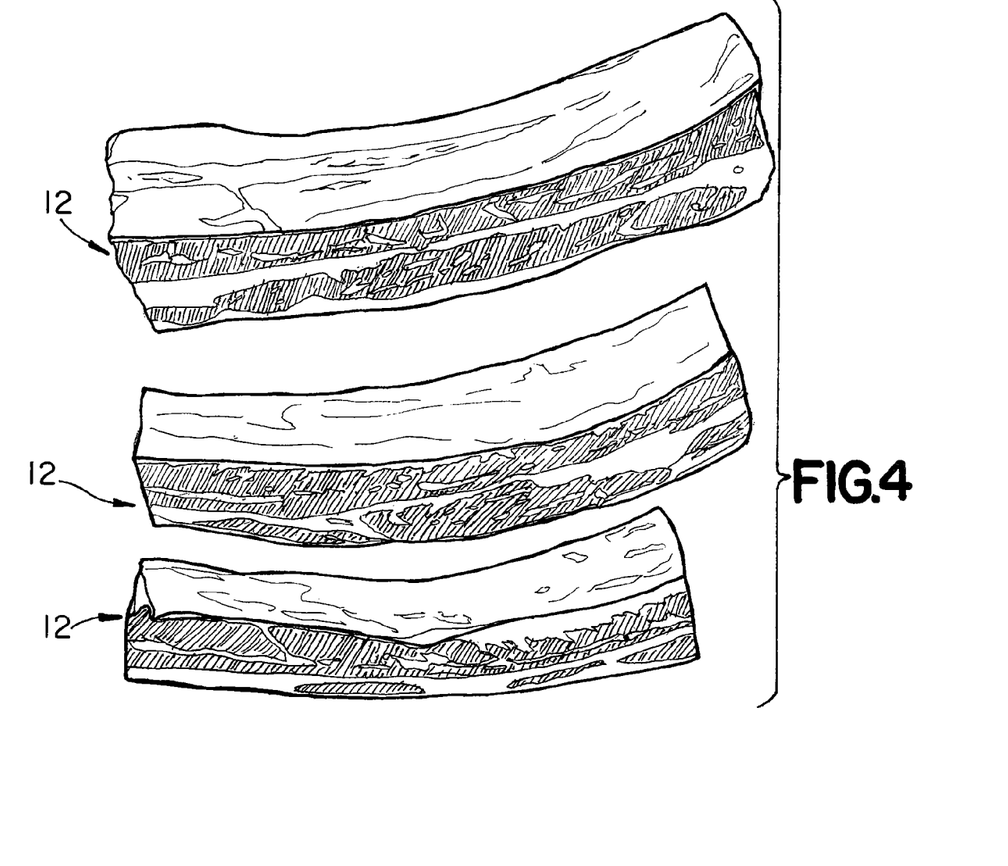
FIG. 4 is a perspective view of the three individual rib meat portions shown in FIG. 3 after having been separated in accordance with the present method.

Referring to FIGS. 3 and 4, the first step in practicing the present method is to separate the short ribs 10 into three generally equal sized individual rib meat portions 12 by cutting completely through the short ribs 10 from a first principle surface to a second principle surface along two cut lines 14 (only one shown in FIG. 3) which extend generally parallel to the rib bones 16. Preferably each of the cut lines 14 is positioned about one half of the way between the rib bones 16 on each side so that the amount of meat on each of the bones 16 which form the rib meat portions 12 is generally about equal in all three rib meat portions 12. The cuts through the short ribs 10 may be made using a knife (shown in FIG. 3), saw, water knife or any other suitable cutting device.

Figure 5:
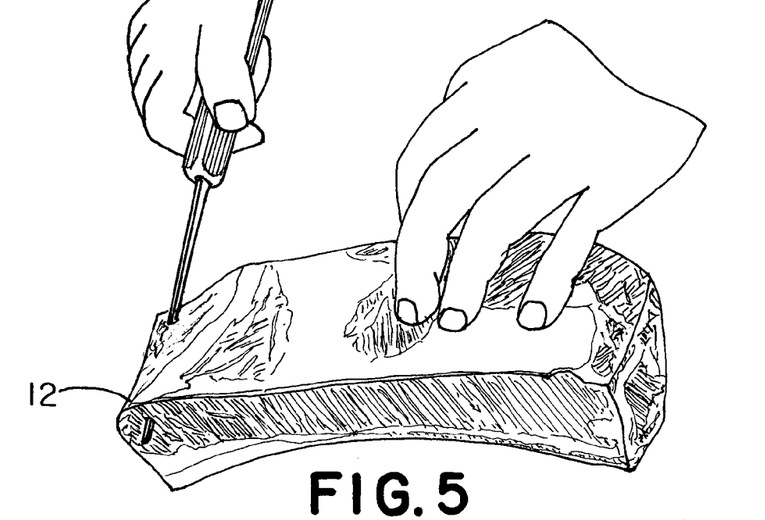
FIG. 5 is a perspective view of one of the separated rib meat portions shown in FIG. 4 being trimmed to remove excess fat, silver and the like in accordance with the present method.
Figure 6:
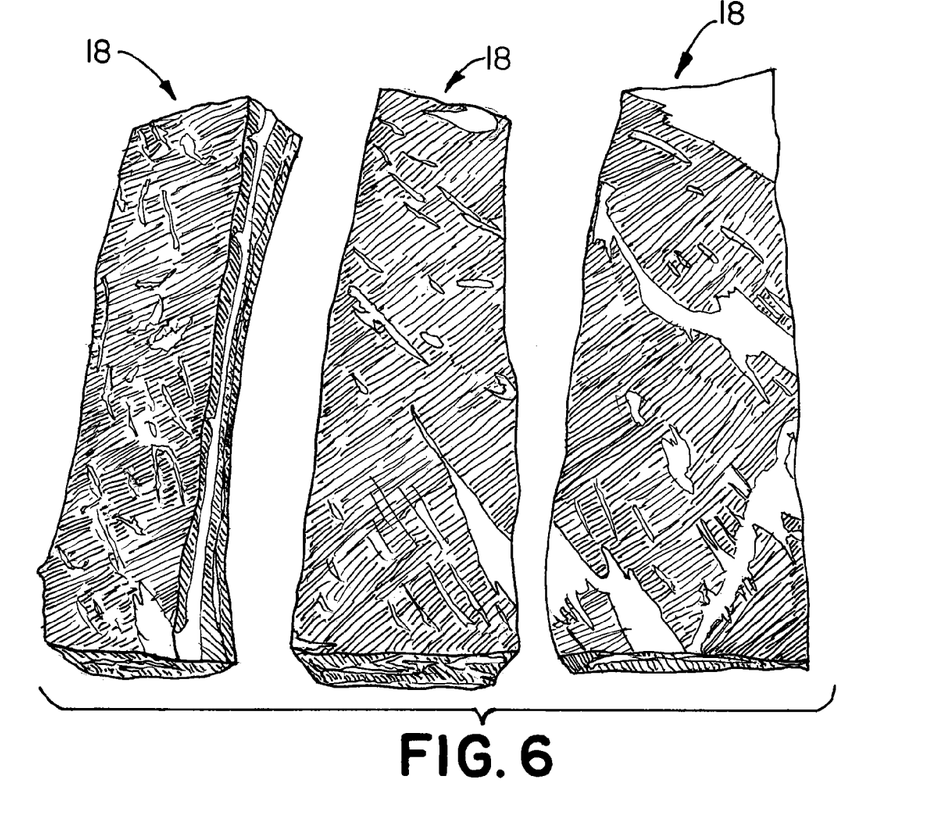
FIG. 6 is a perspective view of the three separated individual rib meat portions after completion of the trimming step shown in FIG. 5.

The next step in practicing the present method, shown in FIG. 5, is to trim each of the three individual rib meat portions 12 to remove excess fat, seams, silver and other undesirable components which are thereafter used elsewhere or disposed of. Removing excess fat and the like provides leaner, healthier rib meat portions 18. Preferably the rib meat portions 12 are trimmed using a knife. However some other suitable tool or device may be used for the trimming if desired. FIG. 6 shows the three trimmed rib meat portions 18 after removal of the excess fat and the like.

Figure 7:
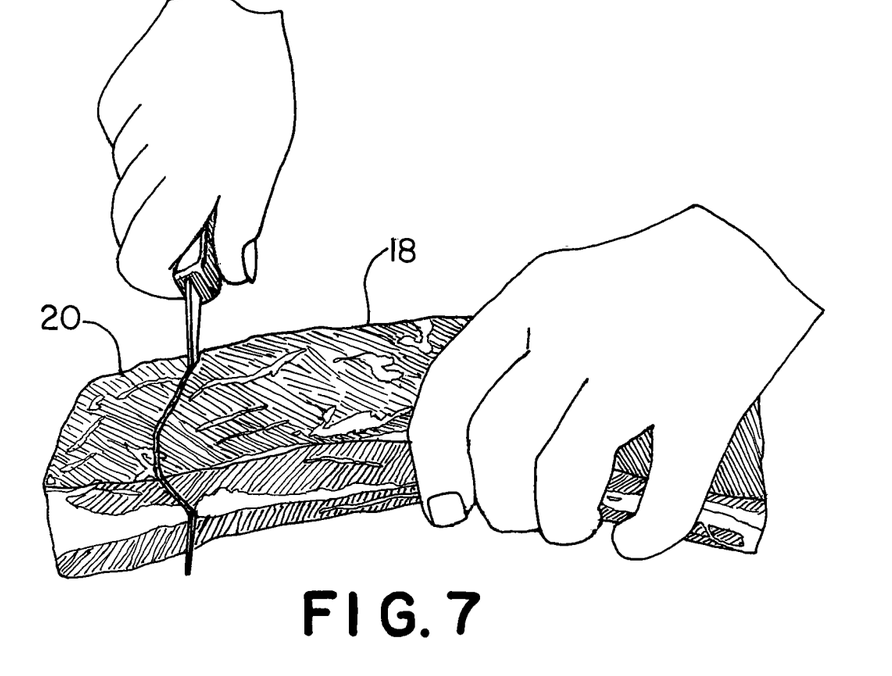
FIG. 7 is a perspective view of one of the trimmed rib meat portions of FIG. 6 being cut in accordance with the present method to remove a portion of the meat from one end and expose a portion of the one end of the rib bone.
Figure 8:
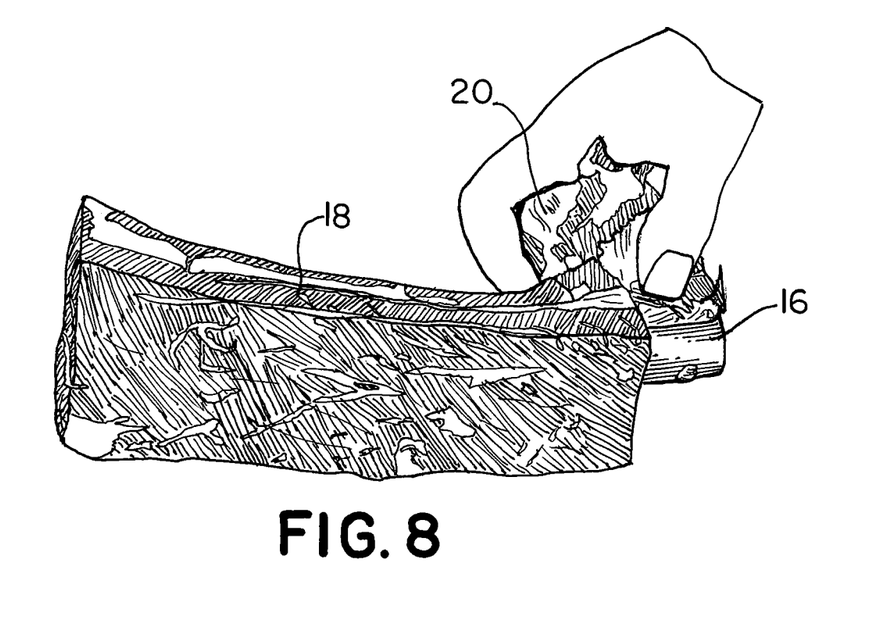
FIG. 8 is a perspective view of the trimmed rib meat portion of FIG. 7 being cut in accordance with the present method to remove a portion of the meat from one end and expose a portion of the one end of the rib bone.
Figure 9:
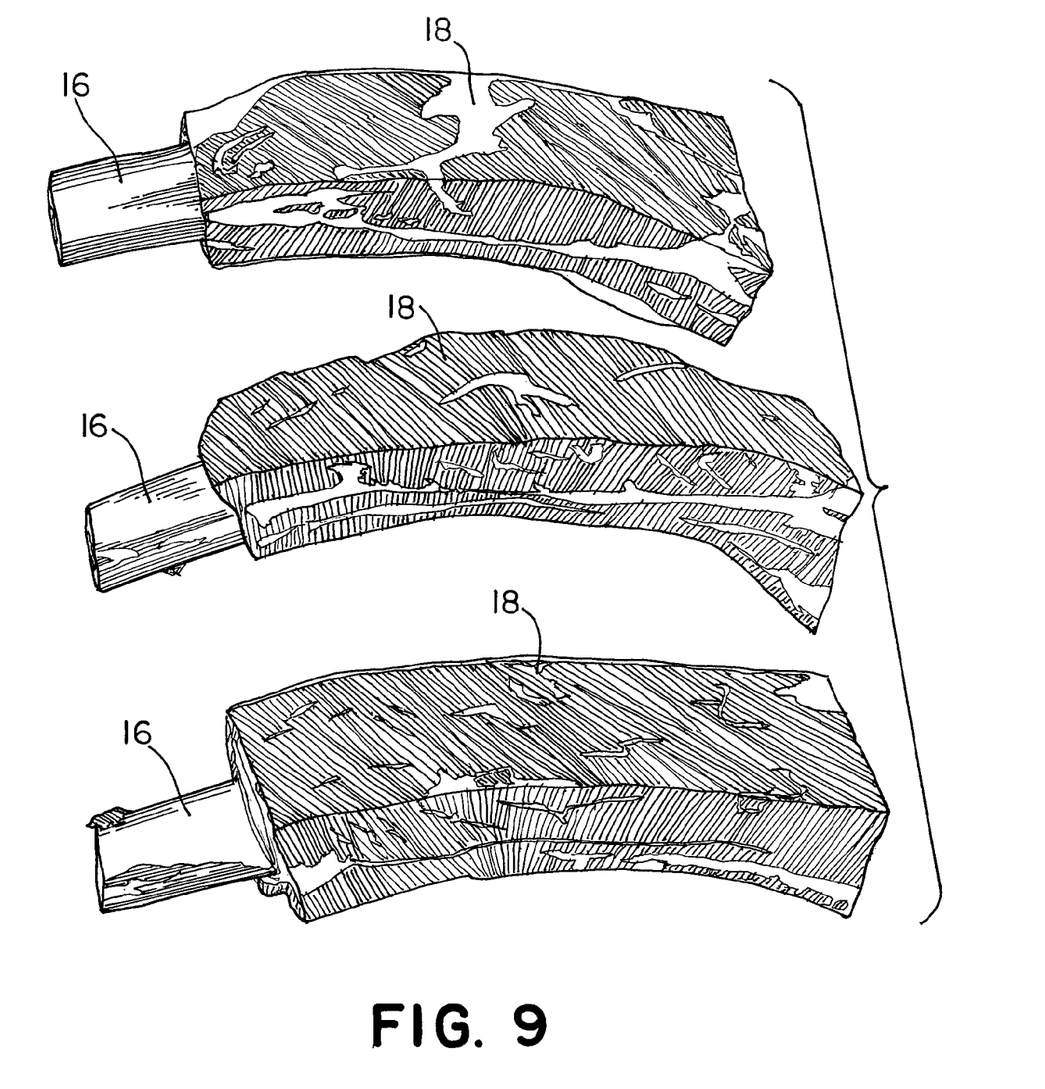
FIG. 9 is a perspective view of the three trimmed rib meat portions of FIG. 6 after the exposure of the one end of the rib bones as shown in FIGS. 7 and 8.

The next step in practicing the present method is the removal of a portion of the meat from at least one end of the rib bone 16 of each of the trimmed rib meat portions 18. FIGS. 7 and 8 show the removal of a predetermined length of the meat 20 from the bone 16 of one of the trimmed rib meat portions 18. Preferably, approximately two inches of the meat is removed to expose a portion of the rib bone 16 that is about two inches in length. The meat portion 20 may be removed using a knife (shown in FIG. 7), saw, water knife or any other suitable cutting device. Preferably the meat portion 20 is removed from the end of the trimmed rib portions 18 where the rib bone 16 has the smallest diameter since this end of the trimmed rib portion 18 was closer to the backbone (not shown) and generally has less meat and contains more fat. The process of removing the meat portion 20, sometimes called "Frenching" provides an exposed portion of each of the rib bones 16 which may be used as a convenient handle for holding the rib meat portions 18 during cooking and consumption. It will be appreciated that the present invention is not limited to including a "Frenching" step and that all of the meat may be left on the trimmed rib portions 18 if desired. Likewise, it will be appreciated that a greater or lesser amount of the meat may be removed from the rib bones 16 to vary the size of the exposed bone handle or to vary the amount of meat which remains on the rib bones 16. Also, it will be appreciated that the meat portion 20 may be removed from either or both ends of the rib bones 16 if desired. Further, it will be appreciated that the "Frenching" step may be performed after the below described final step if desired. FIG. 9 shows all three trimmed rib meat portions 18 after the removal of the meat portions 20 (not shown in FIG. 9) to expose the approximately two inch portions on one end of each of the bones 16 which may serve as handles when cooking and consuming the rib meat portions 18.

Figure 10:
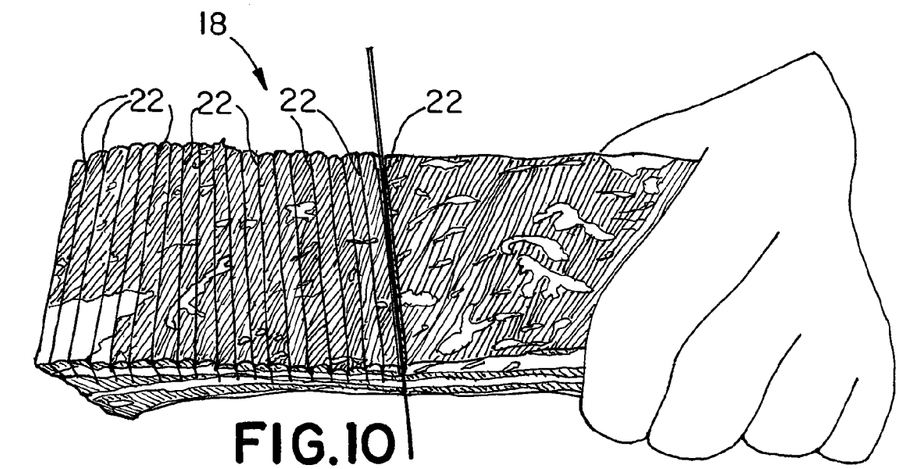
FIG. 10 is a perspective view of one of the rib meat portions of FIG. 9 illustrating a further step of making a series of spaced apart and generally parallel cuts across the bone and into the meat on one surface in accordance with the present method.
Figure 11:
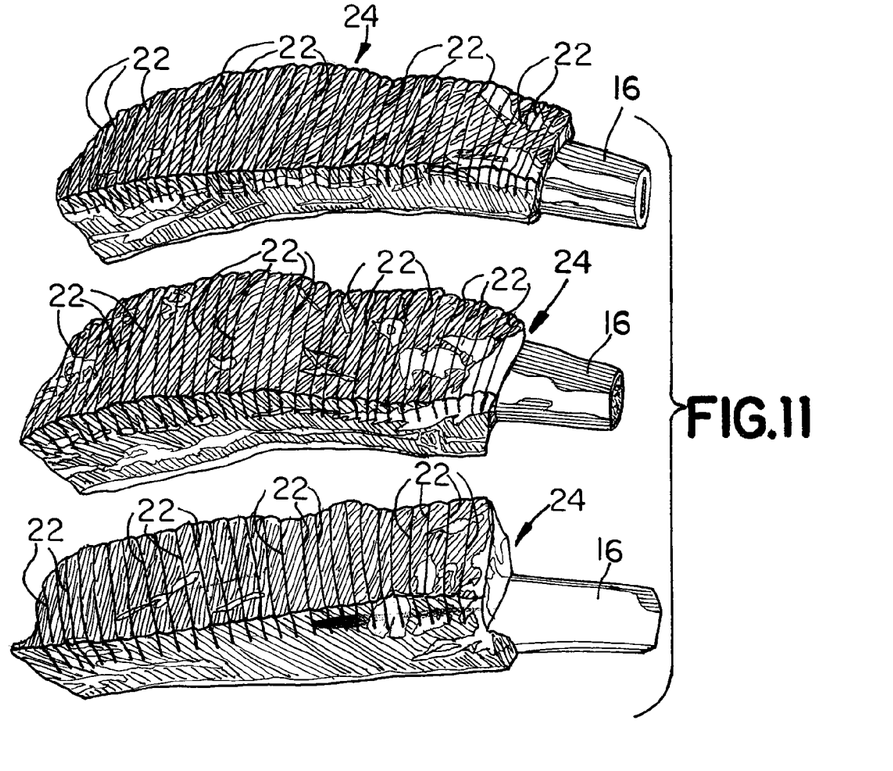
FIG. 11 is a perspective view of the three beef rib products after completion of the step illustrated in FIG. 10.

In the final step in practicing the present method a series of generally parallel, spaced apart cuts 22 are made into the meat of each of the trimmed rib meat portions 18 generally cross bone or orthogonal (perpendicular) to the length direction of the bones 16 as shown in FIG. 10. Preferably each of the cross bone cuts 22 extends completely through the meat on only one surface, preferably the outside surface, and to a depth which extends all the way down to the bone 16 but not beyond the bone 16. In this manner, the meat on the other side of the bone 16 remains uncut to hold the meat onto the bone 16. The cuts 22 extend over the entire length of the meat from one end of the bone 16 to the other or at least to the end of the meat proximate to the exposed bone area and are preferably spaced apart by a first predetermined distance, preferably about one eighth (⅛) of an inch but could be closer together or further apart if desired. The cuts 22 may be made using a knife (shown in FIG. 10), a water knife, saw or any other suitable cutting device. Preferably the cross bone cuts 22 are made simultaneously using a multiple headed blade cutting apparatus of the type available from the Bridge Company. If desired, the cross bone cuts 22 could be made in some other manner. For example, the cuts 22 could be made to a depth which is less than the entire depth to the bone 16 (for example one half of the depth of the meat) and such shallower cuts may also be made to the meat on both principle surfaces. Alternatively, the cross bone cuts 22 could be made into the meat of the inside surface if desired. FIG. 11 shows all three of the trimmed rib meat portions 18 including the spaced cross bone cuts 22 in the outside surface to form the final beef rib products 24 in accordance with the present method.

The beef rib products 24 made in accordance with the present method may be cooked in a manner which is much faster than the way in which the prior art beef short ribs 10 had to be cooked. For example, the beef rib products 24 may be grilled or baked for a relatively short time period. The combination of the trimming and the multiple cross bone cuts 24 make the meat more tender and permit heat from a grill or oven to more quickly permeate the meat and more evenly heat the meat while maintaining tenderness. The beef rib products 24 may be coated with a sauce, such as barbeque sauce prior to, during or after cooking. Additionally, a dry rub may be applied to the beef rib products 24 prior to cooking. Because the cross bone cuts 22 do not extend to the meat on both sides of the bone 16, the uncut side keeps the meat secured to the bone 16 during cooking and consumption. The exposed end of the bone 16 serves as a convenient handle for holding the beef rib products 24 to facilitate preparation and consumption. Since the new beef rib products 24 are more convenient to prepare and easier to eat, demand for the beef rib products 24 will be greater than the demand for the prior art beef short ribs 10 thereby permitting a substantially higher per pound price to be charged for the beef rib products 24.

From the foregoing, it can be seen that the present invention comprises a method of cutting short ribs of beef to make new higher value beef products. It will be appreciated by those skilled in the art that changes could be made to the embodiment described above without departing from the broad inventive concepts thereof. It is understood, therefore, that this invention is not limited to the particular embodiment disclosed, but it is intended to cover all modifications within the spirit and scope of the present invention in accordance with the appended claims.

The invention claimed is:

1. A method of cutting beef short ribs to create beef rib products having enhanced per pound value, the short ribs comprising a plate having a plurality of rib bones taken from between the fifth and thirteenth ribs of beef and the meat surrounding the rib bones, the short ribs having a first, generally concavely shaped inside surface and a second generally convexly shaped outside surface, the method comprising the steps of:

separating the short ribs into a plurality of generally equally sized individual rib meat portions, each having a rib bone, by cutting completely through the short ribs from the first surface to the second surface along cut lines extending generally midway between and generally parallel to the rib bones; and making a series of generally parallel cuts into the meat on at least one of the first and second surfaces of each of the rib portions, the cuts made into each rib portion extending generally perpendicular to the rib bone along the entire length of the meat from one end of the rib bone to the other end of the rib bone and being spaced apart from each other by a first predetermined distance.

2. The method as recited in claim 1 further comprising the step of trimming each of the individual rib meat portions to remove excess fat, silver and other undesirable components prior to making the series of generally parallel cuts.

3. A meat product made in accordance with the method of claim 2.

4. The method as recited in claim 1 wherein the first predetermined distance is about one eighth of an inch.

5. The method as recited in claim 1 wherein the series of generally parallel cuts are made into the meat on only one of the first and second surfaces of each of the rib portions and the depth of each cut extends to but not beyond the rib bone.

6. The method as recited in claim 5 wherein the one surface is the second surface.

7. The method as recited in claim 1 wherein the series of parallel cuts are made into the meat on both of the first and second surfaces of each of the rib portions and the depth of each cut extends to less than the distance to the rib bone.

8. The method as recited in claim 1 further comprising the step of removing a predetermined length of the meat from at least one end of each of the rib bones to expose a portion of each of the rib bones.

9. A meat product made in accordance with the method of claim 8.

10. A meat product made in accordance with the method of claim 1.

11. The method as recited in claim 1 wherein the series of generally parallel cuts are made into the meat only on one of the first and second surfaces of the rib meat portion and the depth of each cut extends to but not beyond the rib bone.

12. A method of cutting beef short ribs to create a beef rib product having enhanced per pound value, the short ribs including at least two ribs taken from between the fifth and thirteenth ribs of beef and the meat surrounding the rib bones, the short ribs having a first, generally concavely shaped inside surface and a second generally convexly shaped outside surface, the method comprising the steps of:

separating from the short ribs an individual rib meat portion containing meat attached to a rib bone by cutting completely through the short ribs from the first surface to the second surface along at least one cut line extending generally parallel to and spaced from the rib bone; and making a series of generally parallel cuts into the meat on at least one of the first and second surfaces of the rib meat portion, the cuts extending generally perpendicular to the rib bone along the entire length of the meat from one end of the rib bone to the other end of the rib bone and being spaced apart from each other by a first predetermined distance.

13. The method as recited in claim 12 further comprising the step of trimming the rib meat portion to remove excess fat, silver and other undesirable components prior to making the series of generally parallel cuts.

14. A meat product made in accordance with the method of claim 13.

15. The method as recited in claim 12 wherein the first predetermined distance is about one eighth of an inch.

16. The method as recited in claim 12 wherein the series of parallel cuts are made into both the first and second surfaces of rib meat portion and the depth of each cut extends to less than the distance to the rib bone.

17. The method as recited in claim 12 further comprising the step of removing a predetermined length of the meat from at least one end of the rib bone to expose a portion of the rib bone.

18. A meat product made in accordance with the method of claim 17.

19. A meat product made in accordance with the method of claim 12.

20. A method of cutting beef short ribs to create beef rib products having enhanced per pound value, the short ribs comprising a plate having at least three rib bones taken from between the fifth and thirteenth ribs of beef and the meat surrounding the rib bones the short ribs having a first, generally concavely shaped inside surface and a second generally convexly shaped outside surface, the method comprising the steps of:

separating the short ribs into three generally equally sized individual rib meat portions, each having a rib bone, by cutting completely through the short ribs from the first surface to the second surface along two cut lines extending generally midway between and generally parallel to the rib bones;

trimming each of the rib meat portions to remove excess fat, silver and other undesirable components;

making a series of generally parallel cuts into the meat on at least one of the first and second surfaces of each of the rib meat portions, the cuts made into each rib meat portion extending generally perpendicular to the rib bone along the entire length of the meat from one end of the rib bone to the other end of the rib bone and being spaced apart from each other by a first predetermined distance; and removing a predetermined length of the meat from at least one end of each of the rib bones to expose a portion of each of the rib bones.

* * * * *